(12) United States Patent
Labate et al.

(10) Patent No.: US 10,549,200 B2
(45) Date of Patent: Feb. 4, 2020

(54) MATCHMAKING FOR ONLINE GAMING WITH STREAMING PLAYERS

(71) Applicant: Electronic Arts, Inc., Redwood City, CA (US)

(72) Inventors: Jesse Alan Labate, San Jose, CA (US); Mark Ryan Waller, San Jose, CA (US); Glenn Arne Karlsen, Vancouver (CA)

(73) Assignee: Electronic Arts, Inc., Redwood City, CA (US)

( * ) Notice: Subject to any disclaimer, the term of this patent is extended or adjusted under 35 U.S.C. 154(b) by 1 day.

(21) Appl. No.: 15/915,888

(22) Filed: Mar. 8, 2018

(65) Prior Publication Data
US 2019/0275431 A1 Sep. 12, 2019

(51) Int. Cl.
| | |
|---|---|
| *A63F 13/67* | (2014.01) |
| *H04L 29/06* | (2006.01) |
| *A63F 13/358* | (2014.01) |
| *A63F 13/86* | (2014.01) |
| *G06F 16/9535* | (2019.01) |
| *G06F 16/2457* | (2019.01) |

(52) U.S. Cl.
CPC ............ *A63F 13/67* (2014.09); *A63F 13/358* (2014.09); *A63F 13/86* (2014.09); *G06F 16/24578* (2019.01); *G06F 16/9535* (2019.01); *H04L 65/60* (2013.01)

(58) Field of Classification Search
None
See application file for complete search history.

(56) References Cited

U.S. PATENT DOCUMENTS

| | | | |
|---|---|---|---|
| 8,998,726 B1 | 4/2015 | Wakeford et al. | |
| 9,776,091 B1 | 10/2017 | Lebrun et al. | |
| 9,905,076 B2* | 2/2018 | Landen | G07F 17/3227 |
| 2007/0112706 A1* | 5/2007 | Herbrich | G07F 17/32 706/21 |
| 2008/0114806 A1* | 5/2008 | Kosche | G06F 11/3409 |
| 2010/0151933 A1 | 6/2010 | Shibamiya et al. | |
| 2010/0227691 A1* | 9/2010 | Karsten | G07F 17/32 463/42 |

(Continued)

OTHER PUBLICATIONS

International Search Report and Written Opinion dated Apr. 5, 2019, for PCT Application No. PCT/US2018/066500, 8 pages.

(Continued)

*Primary Examiner* — Ronald Laneau
(74) *Attorney, Agent, or Firm* — Lee & Hayes, P.C.

(57) ABSTRACT

A matchmaking system matches players for online gaming, when some of the players may be streaming players and other players may be non-streaming players. The streaming players, due to receiving content of the online game via computer networks from a streaming system, may experience a relatively greater network latency for game events relative to non-streaming players. When matching streaming players and non-streaming players for online game play, the relative competitive disadvantage for streaming players due to network latency may be compensated. Additionally, streaming players using input devices that may be more difficult to use and/or may be less responsive during game play, such as a touch screen, may also have their input device disadvantage compensated during matchmaking.

20 Claims, 10 Drawing Sheets

(56) References Cited

U.S. PATENT DOCUMENTS

| | | |
|---|---|---|
| 2015/0038234 A1 | 2/2015 | Bojorquez et al. |
| 2016/0001181 A1 | 1/2016 | Marr et al. |
| 2016/0038234 A1 | 2/2016 | Ladtkow et al. |
| 2016/0125521 A1* | 5/2016 | Randel ................ G06F 16/9535 705/26.3 |
| 2017/0252653 A1 | 9/2017 | Kada |
| 2018/0078861 A1 | 3/2018 | Borggren |

OTHER PUBLICATIONS

Non Final Office Action dated Nov. 15, 2019 for U.S. Appl. 15/925,224 "Game Quality-Centric Matchmaking for Online Gaming" Karlsen, 11 pages.

* cited by examiner

| PLAYER | SKILL SCORE | STREAMING OR NON-STREAMING | LATENCY | SLSC | MODIFIED SKILL SCORE |
|---|---|---|---|---|---|
| PLAYER A | 80 | STREAMING | 73 MS | -14 | 66 |
| PLAYER B | 62 | STREAMING | 56 MS | -11 | 51 |
| PLAYER C | 48 | NON-STREAMING | — | — | — |
| PLAYER D | 89 | STREAMING | 82 MS | -16 | 73 |
| PLAYER E | 71 | NON-STREAMING | — | — | — |
| PLAYER F | 54 | NON-STREAMING | — | — | — |
| PLAYER G | 68 | STREAMING | 44 MS | -7 | 61 |
| PLAYER H | 87 | STREAMING | 118 MS | -24 | 63 |
| PLAYER I | 52 | NON-STREAMING | — | — | — |

ONLINE GAME 1: PLAYER A, PLAYER G, PLAYER H
ONLINE GAME 2: PLAYER B, PLAYER C, PLAYER F, PLAYER I
ONLINE GAME 3: PLAYER D, PLAYER E

FIG. 4

| Player | Skill Score | Streaming or Non-Streaming | Latency | SLSC | Input Device | SIDSC | Modified Skill Score |
|---|---|---|---|---|---|---|---|
| Player A | 80 | Streaming | 73 ms | -14 | Mouse | -3 | 63 |
| Player B | 62 | Streaming | 56 ms | -11 | Game Controller | 3 | 54 |
| Player C | 48 | Non-Streaming | — | — | — | — | — |
| Player D | 89 | Streaming | 82 ms | -16 | Joystick | -1 | 72 |
| Player E | 71 | Non-Streaming | — | — | — | — | — |
| Player F | 54 | Non-Streaming | — | — | — | — | — |
| Player G | 68 | Streaming | 44 ms | -7 | Game Controller | 3 | 64 |
| Player H | 87 | Streaming | 118 ms | -24 | Touch Screen | -7 | 56 |
| Player I | 52 | Non-Streaming | — | — | — | — | — |

700

Online Game 1: Player A, Player G
Online Game 2: Player B, Player C, Player F, Player H, Player I
Online Game 3: Player D, Player E

FIG. 7

MATCHMAKING FOR ONLINE GAMING WITH STREAMING PLAYERS

BACKGROUND

Online gaming allows for players to play a variety of electronic and/or video games with each other via network connectivity, such as via the Internet. Users who wish to play a game may be matched with each other to play the game, even though those players may be remotely located from each other. Online gaming may be enabled by gaming system(s) to which each of the players may connect using client devices. Some client devices may be game client devices, and other client devices may be streaming client devices. The streaming client devices may receive rendered game content (e.g., video, audio, haptics, etc.), from a remote streaming system(s), while game client devices may receive game state data from the gaming system(s) and locally render the game content for the player.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 4 illustrates a chart of an example set of player matchmaking according to each player's respective skill score and/or streaming latency skill compensator (SLSC) modified skill score, in accordance with example embodiments of the disclosure.

FIG. 7 illustrates a chart of an example set of player matchmaking according to each player's respective skill score, streaming latency skill compensator (SLSC) modified skill score, and/or streaming input device skill compensator (SIDSC) modified skill score, in accordance with example embodiments of the disclosure.

DETAILED DESCRIPTION

Figure 1:
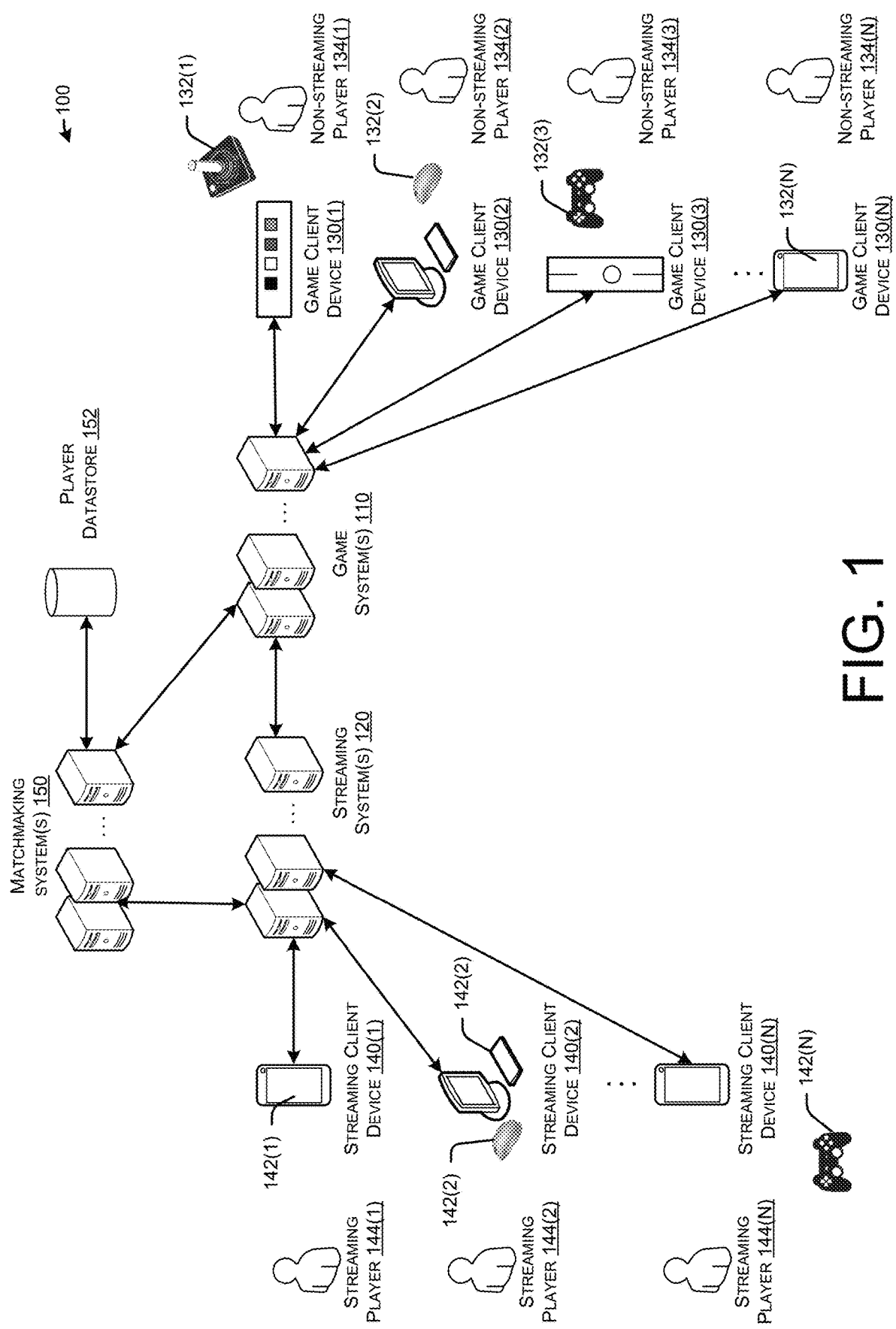
FIG. 1 illustrates a schematic diagram of an example environment with gaming system(s) and steaming system(s) to enable online gaming via game client device(s) and streaming client device(s), in accordance with example embodiments of the disclosure.

Example embodiments of this disclosure describes methods, apparatuses, computer-readable media, and system(s) for matching players for online gaming. In example embodiments of the disclosure, players who play an online game via streaming and players who play the same online game without streaming may be matched with each other in accordance with the disclosure herein. The matchmaking, as disclosed herein, may compensate for inherent disadvantages in the rendering and/or reaction time of player(s) that stream an online game relative to non-streaming player(s) due to network speed limitations.

It should be noted that streaming players may have a streaming client device on which the current state of the online game may be presented to the streaming players. This presentation may include any variety of content, such as video, audio, haptics, or any other suitable rendered output that represents the current state of the online game and can be perceived by the player. The streaming client device may receive the content to be presented to the streaming player from one or more streaming system(s). Thus, the content of the online game, for the streaming player, may be rendered at one or more streaming system(s) and streamed to the streaming player's streaming client device for presentation to the streaming player.

On the other hand, a non-streaming player may engage with the game via his or her game client device, which renders the game locally at the client device. Thus, there is no need for one or more streaming system(s) to render and stream the online game content for the non-streaming players. In many cases, the streaming of the game, and the network latency and/or network bandwidth limits associated therewith, may result in a delay in the rendering of the game for a streaming player relative to a non-streaming player. This latency, in turn, may cascade to a disadvantage in response times of streaming players to events in the online game relative to non-streaming players. The disclosed embodiments, as described herein, matches streaming and non-streaming players, taking into account disadvantages the streaming players may face during game play due to streaming latency. By adjusting how skill metrics of players are used for differences in network latency experienced by streaming players and non-streaming players, matchmaking system(s) may provide better matched online games, resulting in a more enjoyable gaming experience for the streaming players and non-streaming players alike.

In example embodiments, players who wish to play an online game may be matched to each other by one or more matchmaking system(s) based at least in part on historical metrics associated with each of the players. For example, based at least in part on historical game play, each player may have a corresponding skill score. A player who exhibits a relatively higher level of skill compared to another player may have a higher skill score than the other player. When a plurality of players wish to play an online game, the online game may be formed by matching players with relatively similar skill scores. By enabling games with players of relatively similar skill scores, and therefore relatively similar skill levels, a more enjoyable game may be achieved for the players than if there is a relatively high disparity in the skill scores and/or skill levels of the players. The skill score of each of the players may be associated with the respective players by way of a user account for each of the players. The user account for each of the players may associate various information about the respective players, including his or her skill score, and may be stored and accessed by one or more matchmaking system(s).

For streaming players, skill scores may not be representative of their expected performance on a particular game because of latencies inherent to streaming that are not experienced by non-streaming players. In other words, two players with the same skill score may not have the same expected performance when matched with each other, if one of the players is playing in non-streaming mode and the other player is playing in streaming mode. In fact, the greater the communicative latency and/or the lower the communicative bandwidth between the streaming system(s) and the streaming client device of the streaming player, the greater the disadvantage may be for the streaming player relative to the non-streaming player during online game play.

In accordance with example embodiments of the disclosure, a streaming player may be matched with a non-streaming player who has a lower skill score than the streaming player to at least partially compensate for the disadvantages associated with streaming play. This matching of streaming and non-streaming players may entail determining a modified skill score for each of the streaming players, and using the modified skill scores to match to other players. In other words, a modified skill score may be determined, where the modified skill score is lower than the skill score of a streaming player. At this point, the modified skill score may be compared with the modified skill scores of other streaming players and skill scores of other non-streaming players to match players for an online game.

In further example embodiments, the modified skill score for a streaming player may be based at least in part on the level of network latency and/or network bandwidth between the one or more streaming system(s) and the streaming player's streaming client device. The matchmaking system(s) may determine a streaming latency skill compensator (SLSC) for a particular streaming player based at least in part on the corresponding latency and/or bandwidth between the streaming player's streaming client device and the one or more streaming system(s). The SLSC may then be used to generate the modified skill score of the streaming player by subtracting the SLSC value from the player's skill score. As a result, the SLSC may take into account a streaming player's network speed (e.g., network latency and/or network bandwidth), and compensate for that streaming latency, relative to non-streaming players.

The SLSC, in example embodiments, may be determined using any suitable mechanism, such as a look-up table or a function, that relates SLSC values to network speed metrics, such as network latency and/or network bandwidth. The matchmaking system(s) may determine a level of latency and/or bandwidth between the streaming player's streaming client device and the one or more streaming system(s). This may be determined by receiving a message from the one or more streaming system(s) indicating the latency and/or bandwidth. In some example embodiments, the latency and/or bandwidth between the streaming client device and the one or more streaming system(s) may be provisioned by the matchmaking system(s) from the streaming system(s) and/or game system(s). The SLSC for the streaming player may be determined by the one or more matchmaking system(s) using the level of latency and/or bandwidth between the streaming client device and the one or more streaming system(s).

The matchmaking system(s), according to example embodiments, may further access skill scores of the players who wish to play an online game. The skill score for each player, in some example embodiments, may be for the particular online game and/or game mode of play of the online game. Once the skill score is determined, such as from a player datastore, the one or more matchmaking system(s) may decrement the skill score for the streaming player(s) by their corresponding SLSC value(s) to generate the player's corresponding modified skill score. At this point, the one or more matchmaking system(s) may match the players who wish to play an online game according to their skill score for the non-streaming player(s) and their modified skill score for the streaming player(s).

According to example embodiments of the disclosure, the skill score of a streaming player may be further modified based at least in part on an input device of the streaming client device. It should be noted that different input devices may result in different levels of response times on part of the streaming player. For example, streaming players who play with a game pad or joystick may have a faster response to events of an online game than streaming players who use a mouse, keyboard, or touch screen as his or her input device. As a result, some of the embodiments, as discussed herein, may compensate for the varying levels of player responsiveness for different types of input devices of the streaming client devices.

The matchmaking system(s) may be configured to determine the type of input device used by a streaming player. This indication of the input device may be sent by the streaming client device of the player, such as in the form of metadata. In some example embodiments, the matchmaking system(s) may request the type of input device of the streaming player prior to matching the streaming player to other players in an online game. The matchmaking system(s) may further be configured to modify a skill score of a streaming player based at least in part on the streaming player's input device.

In example embodiments, similar to determining SLSC value(s) with which to modify a streaming player's skill score, the matchmaking system(s) may be configured to determine a streaming input device skill compensator (SIDSC) based at least in part on the input device of a streaming player. The SIDSC may be determined from a look-up table, function, or indeed, any suitable mechanism. The skill score of a streaming player may be reduced or increased by the SIDSC to generate a modified skill score. In some example embodiments, the skill score of a streaming player may be modified by subtracting both an SLSC value and applying a SIDSC value corresponding to the streaming player.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

FIG. 1 illustrates a schematic diagram of an example environment 100 with game system(s) 110 and steaming system(s) 120 to enable online gaming via game client device(s) 130 and streaming client device(s) 140, in accordance with example embodiments of the disclosure.

The example environment 100 may include one or more non-streaming player(s) 134(1), 134(2), 134(3), ... 134(N), hereinafter referred to individually or collectively as non-streaming player(s) 134, who may interact with respective game client device(s) 130(1), 130(2), 130(3), ... 130(N), hereinafter referred to individually or collectively as game client device(s) 130 via respective input device(s) 132(1), 132(2), 132(3), ..., 132(N), hereinafter referred to individually or collectively as input devices 132.

The example environment 100 may further include one or more streaming player(s) 144(1), 144(2), ... 144(N), hereinafter referred to individually or collectively as streaming player(s) 144, who may interact with respective streaming client device(s) 140(1), 140(2), ... 140(N), hereinafter referred to individually or collectively as streaming client device(s) 140 via respective input device(s) 142(1), 142(2), ..., 142(N), hereinafter referred to individually or collectively as input devices 142.

The game client devices 130 may be configured to render content associated with the online game to respective non-streaming players 134. This content may include video, audio, haptic, combinations thereof, or the like content components. The game client device(s) 130 may receive game state information from the one or more game system(s) 110 that may host the online game played by the player(s) 134, 144 of environment 100. The game client device(s) 130 may use the game state information to render current events of the online game as content. The game state information may be received repeatedly and/or continuously and/or as events of the online game transpire. The game state information may be based at least in part on the interactions that each of the player(s) 134, 144 have via their input device(s) 132, 142 responsive to events of the online game hosted by the game system(s) 110.

As events transpire in the online game, the game system(s) 110 may update game state information and send that game state information to the game client device(s) 130. For example, if the players 134, 144 are playing an online soccer game, and the player 134, 144 playing one of the goalies move in a particular direction, then that movement and/or goalie location may be represented in the game state information that may be sent to each of the game client device(s) 130 for rendering the event of the goalie moving in the particular direction. In this way, the content of the online game is repeatedly updated throughout game play. When the game client device(s) 130 receive the game state information from the game system(s) 110, the game client device(s) 130 may render updated content associated with the online game to its respective player 134. This updated content may embody events that may have transpired since the previous state of the game (e.g., the movement of the goalie).

The game client device(s) 130 may accept input from respective non-streaming players 134 via respective input device(s) 132. The input from the non-streaming players 134 may be responsive to events in the online game. For example, in an online basketball game, if a non-streaming player 134 sees an event in the rendered content, such as an opposing team's guard blocking the paint, the non-streaming player 134 may use his/her input device 132 to try to shoot a three-pointer. Intended action by the non-streaming player 134, as captured via his/her input device 132 may be received by the game client device 130 and sent to the game system(s) 110.

The game client device(s) 130 may be any suitable device, including, but not limited to a Sony Playstation® line of systems, a Nintendo Wii® line of systems, a Microsoft Xbox® line of systems, any gaming device manufactured by Sony, Microsoft, Nintendo, or Sega, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the game client device(s) 130 may execute programs thereon to interact with the game system(s) 110 and render game content based at least in part on game state information received from the game system(s) 110. Additionally, the game client device(s) 130 may send indications of player input to the game system(s) 110. Game state information and player input information may be shared between the game client device(s) 130 and the game system(s) 110 using any suitable mechanism, such as application program interfaces (APIs).

The game system(s) 110 may receive inputs from various players 134, 144 and update the state of the online game based thereon. As the state of the online game is updated, the state may be sent the various game client system(s) 130 for rendering online game content to players 134. In this way, the game system(s) 110 host the online game.

Additionally, the game state information may also be sent by the game system(s) 110, and on behalf of the streaming player(s) 144, to the streaming system(s) 120. In example embodiments, the streaming system(s) 120 may receive online game state information from the game system(s) 110, render the content of the online game for the streaming players 144, and stream the rendered online content to individual ones of the streaming client devices 140. The streaming system(s) 120, therefore, may be able to use the game state data from the gaming system(s) 110 to render the online game for the streaming players 144, without the streaming client device(s) 140 having to render the content associated with the online game. The streaming players 144 may experience (e.g., view, hear, feel, etc.) the content associated with the online game on their streaming client devices 140 based at least in part on streaming content as received from the streaming system(s) 120.

As discussed above, there may be network latency and/or relatively low network bandwidth between the streaming system(s) 120 and the streaming client device(s) 140 when transmitting the streaming content to the streaming client devices 140. This network latency and/or network bandwidth limitations between the streaming client device(s) 140 and the streaming system(s) 120 may result in the streaming players 144 experiencing the content associated with the online game at a time after when the non-streaming players 134 experience the same content.

The streaming system(s) 120 may measure network speed information (e.g., network latency, network bandwidth, etc.) between the itself and a streaming client device 140 corresponding to a streaming player 144 who wishes to play an online game. The streaming system(s) 120 may measure network speed by any suitable mechanism, such as a ping test. The ping test may measure an amount of time it takes a round-trip ping, such as a ping to be sent from the streaming system(s) 120 and a response ping to be received back by the streaming system(s) 120. This measurement of pingback time may be used to determine network speed, such as network latency.

The streaming client device(s) 140 may be any of the devices as discussed with respect to the game client device(s) 130, except the streaming client devices operate in a manner where game content is streamed from the streaming system(s) 120, rather than locally rendering at the streaming client device(s). As a result, the streaming client device(s) 140 may include functionality and/or software to present streaming content to its respective streaming player(s) 144.

The example environment 100 may further include matchmaking system(s) 150 to match players 134, 144 who wish to play the same game and/or game mode with each other. Players 134, 144 may be matched according to one or more metrics associated with the players 134, 144, such as skill at a particular game. The matchmaking system(s) 150 may receive an indication from the game system(s) 110 and/or the streaming system(s) 120 of players 134, 144 who wish to play an online game.

The matchmaking system(s) 150 may access information about the players 130, 140 who wish to play a particular game, such as from a player datastore 152. The information about the players 130, 140 may include skill scores. A player's skill score in a particular game may be an estimate of a player's expected performance in that game based at least in part on historic game performance data. Once the matchmaking system(s) 150 access player skill scores, the matchmaking system(s) 150 may be configured to match players 130, 140 based at least in part on their respective skill scores.

The matchmaking system(s) 150 in example embodiments, may receive information about network speed between the streaming system(s) 120 and individual streaming client devices 140 corresponding to a streaming player 144 who wishes to be matched in an online game. In some cases, streaming system(s) 120 may automatically measure and send the matchmaking system(s) 150 network speed information. In other cases, the matchmaking system(s) 150 may request the network speed information from the streaming system(s) 120. This may be by way of one or more message(s) sent by the matchmaking system(s) 150 to the streaming system(s) 120.

The matchmaking system(s) 150 may use information about the network speed between the streaming system(s) 120 and the streaming client device 140 of the player who wishes to play the online game to determine a streaming latency skill compensator (SLSC) value for the streaming player 144. The matchmaking system(s) 150 may determine the SLSC value by any suitable mechanism, such as a look-up table or function that relates any network speed values (e.g., latency, bandwidth, etc.) to SLSC values. The matchmaking system(s) 150 may then decrement the streaming player's skill score by the SLSC value to generate a modified skill score for the streaming player 144.

The matchmaking system(s) 150 may match the streaming player 144 to other players 134, 144 based at least in part on his or her modified skill score. In example embodiments, the matchmaking system(s) 150 may match the streaming player 144 to a non-streaming player 134 with a skill score that may be within a threshold of the streaming player's modified skill score and/or another streaming player 144 with a modified skill score within the streaming player's modified skill score.

The matchmaking system(s) 150 may further still generate a modified skill score for a streaming player by compensating for certain input device(s) 142. The matchmaking system(s) 150 may determine an input device 142 corresponding to a streaming player 144. This information about a streaming player's input device 142 may be received from any one of game system(s) 110, streaming system(s) 120 and/or streaming client device(s) 140. The input device(s) 142 may be any suitable input device including, but not limited to a touch screen, a mouse, a joystick, a game pad, a wearable sensor device, a motion detection device, combinations thereof, or the like.

After the matchmaking system(s) 150 determine a streaming player's input device 142, it may determine a streaming input device skill compensator (SIDSC) value based at least in part on the input device 142 of the streaming player 144 who wishes to play an online game. Similar to the SLSC value, the matchmaking system(s) 150 may determine the SIDSC value by any suitable mechanism, such as a look-up table or function that relates any network speed values (e.g., latency, bandwidth, etc.) to SIDSC values. The matchmaking system(s) 150 may then decrement or increment the streaming player's skill score by the SIDSC value to generate a modified skill score for the streaming player 144.

Similar to the case for the latency-based compensation, the matchmaking system(s) 150 may match the streaming player 144 to other players 134, 144 based at least in part on his or her modified skill score, where the modification of the skill score is based at least in part on the streaming player's input device 142. In example embodiments, the matchmaking system(s) 150 may match the streaming player 144 to a non-streaming player 134 with a skill score that may be within a threshold of the streaming player's modified skill score and/or another streaming player 144 with a modified skill score within the streaming player's modified skill score. In some further example embodiments, the streaming player's skill score may be modified based at least in part on both his or her SLSC value and SIDSC value.

Figure 2:
FIG. 2 illustrates a flow diagram of an example method to match players to form one or more online games including streaming and non-streaming players, in accordance with example embodiments of the disclosure.

FIG. 2 illustrates a flow diagram of an example method 200 to match players to form one or more online games including streaming and non-streaming players, in accordance with example embodiments of the disclosure. The method 200 may be performed by the matchmaking system(s) 150, individually or in cooperation with one or more other elements of the environment 100.

At block 202, one or more streaming player(s) 144 who wish to play an online game may be identified. The one or more streaming player(s) 144 may be identified by the matchmaking system(s) 150 based at least in part on a message and/or an indication from the game system(s) 110 and/or streaming system(s) 120 that the one or more streaming player(s) 144 wish to play the online game. In other cases, the matchmaking system(s) 150 may repeatedly access a shared list and/or database that provides information about players 134, 144 who wish to join different online games. Such a shared list and/or database may be updated by any or all of the matchmaking system(s) 150, the game system(s) 110, and/or the streaming system(s) 120. In example embodiments, a player identifier, such as a player account login or other profile information, corresponding to players 134, 144 may be used to identify the streaming players 144 who wish to play the online game.

At block 204, a skill score for each of the one or more streaming players may be determined. The skill score for each of the one or more streaming players 144 may be determined by accessing a player datastore 152 and using a player identifier for each of the streaming players to access the respective skill scores for the streaming player(s) 144. In some cases, if a player does not have an established playing history then a default skill score may be ascribed to him/her until he/she establishes a playing history sufficient to provide a skill score based on his or her playing abilities. For example, a new player 134, 144, may be ascribed a skill score of 35 on a 1 to 100 scale, indicating an expected below-average skill for a particular online game.

At block 206, a streaming bandwidth and/or streaming latency for each of the streaming players may be determined. As discussed above, in some cases the matchmaking system(s) 150 may receive an indication of network latency and/or network bandwidth from the game system(s) 110 and/or the streaming system(s) 120. In other cases, the matchmaking system(s) 150 may request the streaming system(s) 120 to measure the network latency and/or bandwidth. In response to such a request from the matchmaking system(s) 150 for a particular streaming player 144, the streaming system(s) 120 may measure a network latency between itself and a streaming client device 140 of that particular streaming player 144. Any suitable mechanism for measuring network latency and/or network bandwidth may be used, such as a ping test. In cases where the streaming system(s) 120 may be geographically distributed, the data center or the streaming system 120 that will stream to the particular streaming player 144 may conduct the ping test.

At block 208, a streaming latency skill compensator (SLSC) for each of the one or more streaming players may be determined. In some cases, this SLSC value may be determined based at least in part on one or more models and/or functions that relate a player's network latency to the SLSC values for a particular game. In other cases, the SLSC value may be determined from a lookup table that the matchmaking system(s) 150 may access. It should be noted that the matchmaking system(s) 150 may be used to perform matchmaking for a variety of online games, where different online games may use different levels of network speed-based skill compensation. For example, a turn-based game may offer very little, if any, sensitivity to network speed-based skill compensation, while a fast action game may provide a relatively greater level of sensitivity to network speed-based skill compensation.

At block 210, a modified skill score for each of the one or more streaming players based at least in part on his or her respective SLSC value and skill score may be generated. The modified skill score for each of the one or more streaming players may be determined by subtracting the SLSC value for the player from the player's skill score. In other cases, other operations, such as multiplication, may be used to modify the skill score using the SLSC value. It should be understood that a player's skill score itself is not modified based on whether the player is streaming or not streaming. Rather, only during matchmaking is the player's skill score compensated using the SLSC value determined for that player. In other words, if a streaming player were to subsequently play as a non-streaming player, his or her skill score may be used for matchmaking without compensation thereof.

At block 212, one or more non-streaming players who wish to play the online game may be identified. The non-streaming player(s) 130 may be identified by way of the game system(s) 110 indicating that the non-streaming player(s) 130 wish to play the online game. At block 214, a skill score for each of the one or more non-streaming players may be determined. Similar to the streaming players 140, the skill score for the non-streaming players 130 may be accessed from the player datastore 152 using an identifier for the non-streaming players 134.

At block 216, players to form one or more games for the one or more streaming players and the one or more non-streaming players may be matched based at least in part on the modified skill score corresponding to each of the one or more streaming players and the skill scores corresponding to each of the one or more non-streaming players. In example embodiments, players 130, 140 may be matched based at least in part on being within a threshold amount of skill score or modified skill score of each other.

It should be noted that some of the operations of method 200 may be performed out of the order presented, with additional elements, and/or without some elements. Some of the operations of method 200 may further take place substantially concurrently and, therefore, may conclude in an order different from the order of operations shown above.

Figure 3:
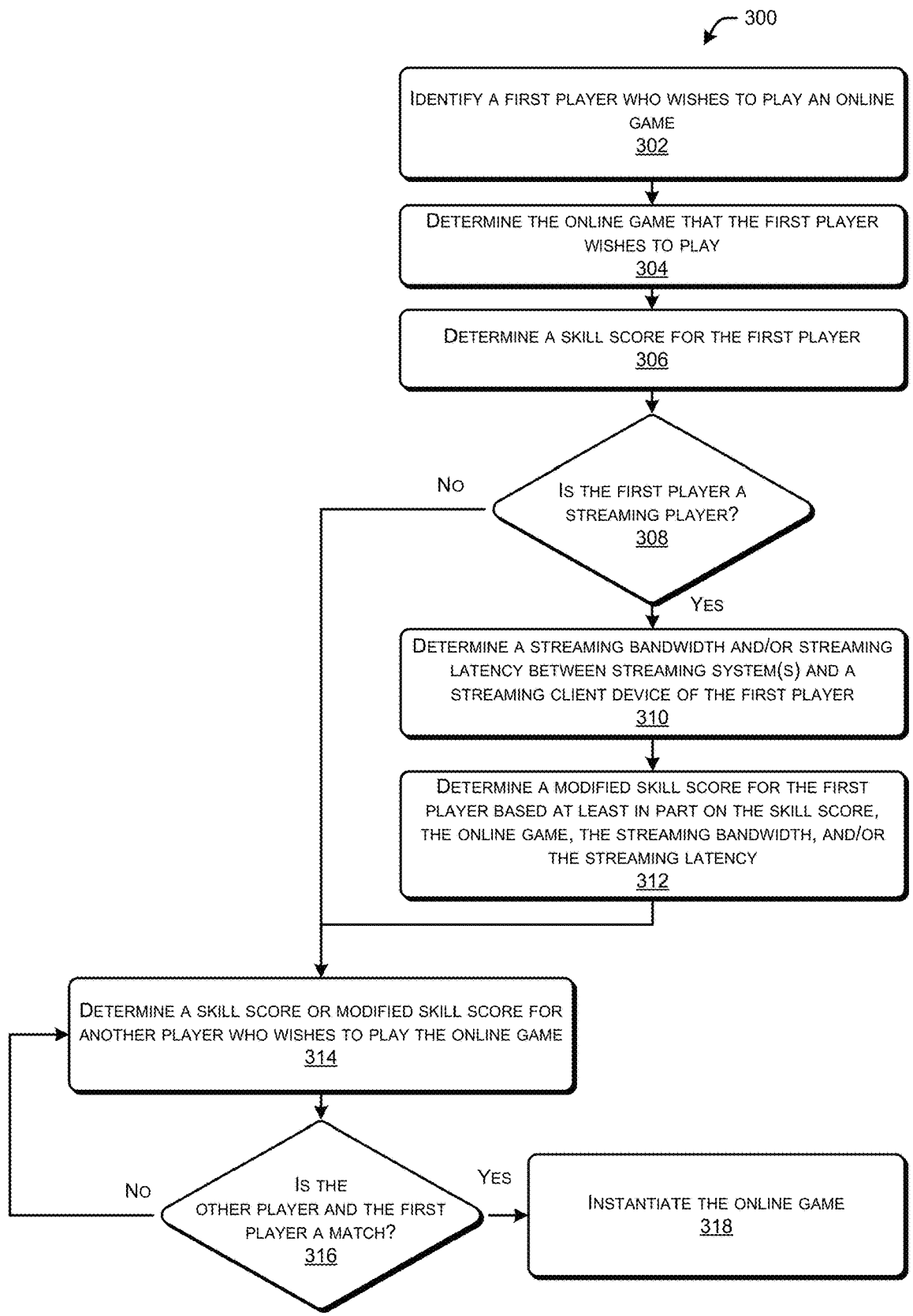
FIG. 3 illustrates a flow diagram of an example method by which a player is matched to another player for an online game, in accordance with example embodiments of the disclosure.

FIG. 3 illustrates a flow diagram of an example method 300 by which a player is matched to another player for an online game, in accordance with example embodiments of the disclosure. The method 300 may be performed by the matchmaking system(s) 150, individually or in cooperation with one or more other elements of the environment 100.

At block 302, a first player who wishes to play an online game may be identified. The first player may be identified by the matchmaking system(s) 150 based at least in part on a message and/or an indication from the game system(s) 110 that the first player wishes to play the online game.

At block 304, the online game that the first player wishes to play may be determined. The online game that the first player wishes to play may be indicated in one or more messages received from the game system(s) 110. Alternatively, the matchmaking system(s) 150 may query this information, such as by using one or more message(s) between the matchmaking system(s) and the game system(s) 110 and/or streaming system(s) 120.

At block 306, a skill score for the first player may be determined. The matchmaking system(s) 150 may determine the skill score or the player by accessing the player datastore 152 and finding the skill score corresponding to the first player's identifier.

At block 308, it may be determined if the first player is a streaming player. This determination may be made based at least in part on information about the first player that may have been received from the game system(s) 110 and/or streaming system(s) 120. For example, there may be metadata associated with a request for joining an online game, as received by the matchmaking system(s) 150. Alternatively, the matchmaking system(s) 150 may query this information form one or both of the game system(s) 110 and/or the streaming system(s) 120. As a further alternative, the matchmaking system(s) 150 may be able to determine if a particular player 134, 144 is a streaming player 144 or a non-streaming player 134 based at least in part on the player's profile, as stored on the player datastore 152, and accessed using a player identification.

If, at block 308, it is determined that the first player is a streaming player, then the method 300 may continue to block 310 where a streaming bandwidth and/or streaming latency between the streaming system(s) and a streaming client device of the first player may be determined. In some cases, this information may be provided to the matchmaking system(s) 150 from the game system(s) 110 and/or the streaming system(s) 120. Alternatively, the matchmaking system(s) 150 may request network speed information from the streaming system(s) 120 that may stream game content to the first player 144 via his or her streaming client device 140.

At block 312, a modified skill score for the first player may be determined based at least in part on the skill score, the online game, the streaming bandwidth, and/or the streaming latency. In some cases, the modified skill score may be the player's skill score with his or her SLSC value subtracted. In other cases, other operations may be performed to determine the streaming player's modified skill score from his or her skill score and SLSC value.

If, at block 308, it was determined that the first player is not a streaming player, then the method 300 may proceed to block 314 where a skill score or modified skill score for another player who wishes to play the online game may be determined.

At block 316, it may be determined if the other player and the first player match. The other player and the first player may be a match if their respective skill score or modified skill score, depending on whether they are streaming players 130 or non-streaming players 134, are within a threshold value. If it is determined at block 316 that the other player and the first player are not a match, then the method 300 may return to block 314 to consider additional players who may be a match for the first player based at least in part on the first player's modified skill score.

On the other hand, if at block 316 it is determined that the other player and the first player are a match, then at block 318 the online game may be instantiated. Instantiation of the game may entail sending a roster of players, as identified by their respective identifiers, to the game system(s) 110 and/or the streaming system(s) 120.

It should be noted that some of the operations of method 300 may be performed out of the order presented, with additional elements, and/or without some elements. Some of the operations of method 300 may further take place substantially concurrently and, therefore, may conclude in an order different from the order of operations shown above.

FIG. 4 illustrates a chart 400 of an example set of player matchmaking according to each player's respective skill score and/or streaming latency skill compensator (SLSC) modified skill score, in accordance with example embodiments of the disclosure.

The chart 400 shows a number of players, such as player A through player I who have corresponding skill scores as shown. For example, player C may have a skill score of 48, while player H may have a skill score of 87. The skill scores used in this example may be on a 0-100 range, but any suitable range (e.g., 0-1, 0-50, etc.) may be used according to example embodiments of the disclosure. As discussed above, the skill scores may be determined by the matchmaking system(s) 150 by accessing a player datastore 152. In example embodiments, the matchmaking system(s) 150, by using a player's identifier, may be able to access the player's skill score from the player datastore 152.

The chart 400 further shows whether each of the players are either streaming players 144 or non-streaming players 134. For example, player D is a streaming player 144, while player F is a non-streaming player 134. Whether a player is streaming or non-streaming may be determined by the matchmaking system(s) 150 using an indication of the same from the game system(s) 110 and/or the streaming system(s) 120. In other cases, the matchmaking system(s) 150 may request information from either the game system(s) 110 and/or the streaming system(s) 120 about whether particular players 134, 144 are streaming or non-streaming players.

The chart 400 further includes a latency value associated with each of the streaming players 144. This latency may be a measured latency between the streaming system(s) 120 and each of the streaming client devices 140 associated with the respective streaming players 140. In some cases, this latency value may be provided by either the streaming system(s) 120 and/or the game system(s) 110. In other cases, the matchmaking system(s) 150 may request, from the streaming system(s) 120, the latency between the streaming system(s) 120 and the streaming client device 140 corresponding to particular ones of the streaming players 144. Responsive to a request by the matchmaking system(s) 150 for the latency value, the streaming system(s) 120 may engage in measuring the latency and/or bandwidth of its network (e.g., Internet, etc.) connection with the streaming client device 140 associated with the particular streaming player 144. In some cases, this may be a ping test mechanism for measuring the network latency and/or the network bandwidth.

Based at least in part on the latency, the matchmaking system(s) 150 may determine SLSC values for each of the streaming players 144. In some cases, this may entail the matchmaking system(s) 150 accessing a look-up table for the particular online game which relates network latency to SLSC values. As the network latency increases, the magnitude of the SLSC also increases to provide a greater compensation for slower network speeds. In this example, the modified skill score for each of the streaming players may be determined by combining the streaming player's skill score and his or her SLSC value. Once the modified skill scores for each of the streaming players 144 have been determined, the players 134, 144 may be compared to each other according to their modified skill scores or skill scores depending on whether they are a streaming player 144 or a non-streaming player 144, respectively.

Based at least in part on the modified skill scores for the streaming players 144 and the skill scores for the non-streaming players 134, the players 134, 144 may be combined into different online games. This process may involve finding those players who have respective modified skill scores or skill scores that are within a threshold value of each other. For example, as shown, three online games may be formed for playing this online game. Each of the players 134, 144 on these teams may have modified skill scores or skill scores that are within a threshold of each other. As shown online game 1 may include players A, G, and H, while online game 2 may include players B, C, F, and I, while online game 3 may include players D and E. Each of these online games may instantiated by sending the corresponding online game rosters to the game system(s) 110.

Figure 5:
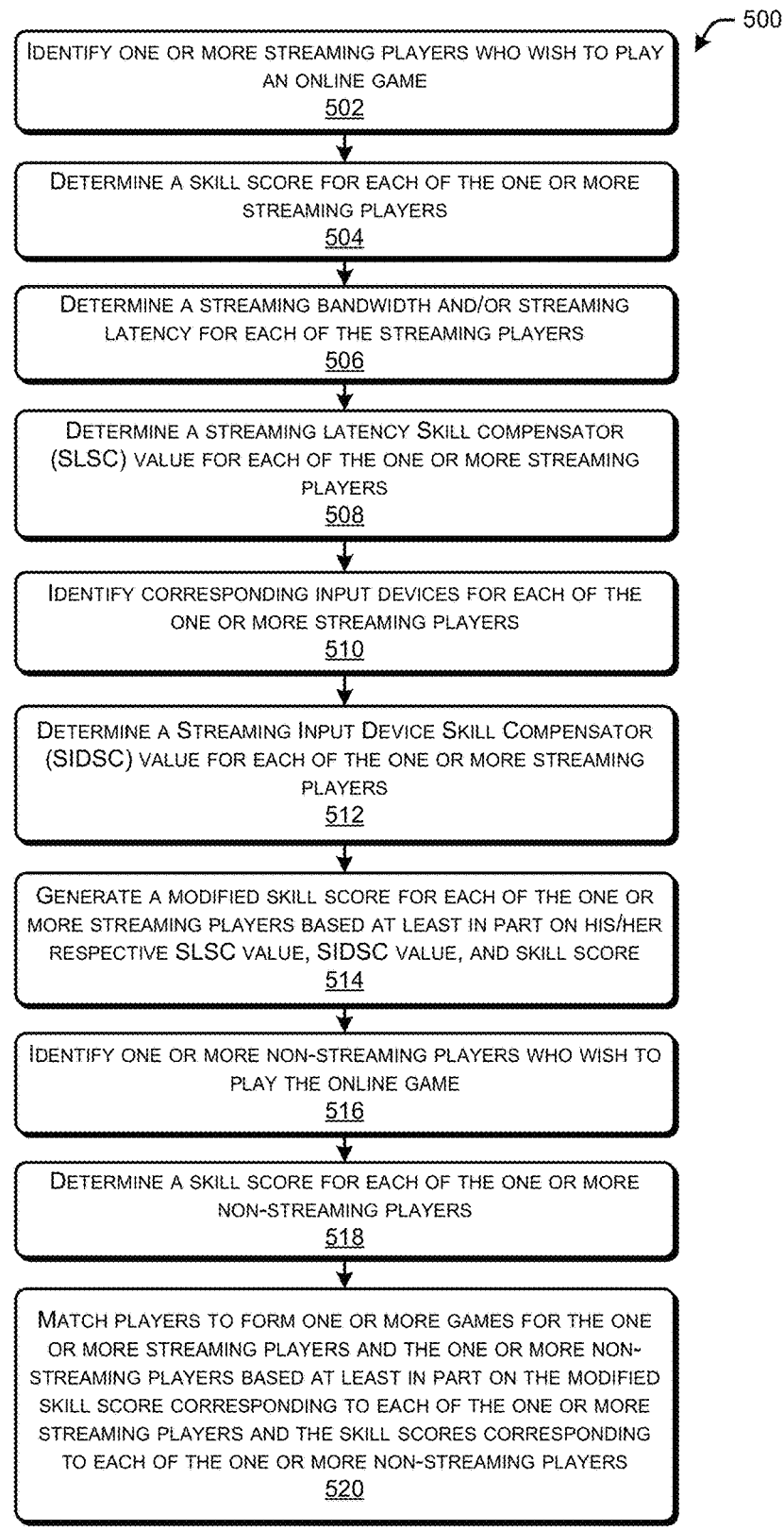
FIG. 5 illustrates a flow diagram of an example method to match players to form one or more online games including streaming and non-streaming players and/or players with different input devices, in accordance with example embodiments of the disclosure.

FIG. 5 illustrates a flow diagram of an example method 500 to match players to form one or more online games including streaming and non-streaming players 130, 140 and/or players with different input devices 142, in accordance with example embodiments of the disclosure. The method 500 may be performed by the matchmaking system(s) 150, individually or in cooperation with one or more other elements of the environment 100.

At block 502, one or more streaming players who wish to play an online game may be identified. This identification may be based upon a message and/or indication sent from the game system(s) 110 and/or streaming system(s) 120 indicating the players who wish to play the online game. In other cases, the matchmaking system(s) 150 may repeatedly access a shared list and/or database that provides information about players 134, 144 who wish to join different online games. Such a shared list and/or database may be updated by any or all of the matchmaking system(s) 150, the game system(s) 110, and/or the streaming system(s) 120. In example embodiments, a player identifier, such as a player account login or other profile information, corresponding to players 134, 144 may be used to identify the streaming players 144 who wish to play the online game.

At block 504, a skill score for each of the one or more streaming players may be determined. The skill score for each of the one or more streaming players 144 may be determined by accessing a player datastore 152 and using a player identifier for each of the streaming players to access the respective skill scores for the streaming player(s) 144. In some cases, if a player does not have an established playing history then a default skill score may be ascribed to him/her until he/she establishes a playing history sufficient to provide a skill score based on his or her playing abilities. For example, a new player 134, 144, may be ascribed a skill score of 35 on a 1 to 100 scale, indicating an expected below-average skill for a particular online game.

At block 506, a streaming bandwidth and/or streaming latency for each of the streaming players may be determined. As discussed above, in some cases the matchmaking system(s) 150 may receive an indication of network latency and/or network bandwidth from the game system(s) 110 and/or the streaming system(s) 120. In other cases, the matchmaking system(s) 150 may request the streaming system(s) 120 to measure the network latency and/or bandwidth. In response to such a request from the matchmaking system(s) 150 for a particular streaming player 144, the streaming system(s) 120 may measure a network latency between itself and a streaming client device 140 of that particular streaming player 144. Any suitable mechanism for measuring network latency and/or network bandwidth may be used, such as a ping test. In cases where the streaming system(s) 120 may be geographically distributed, the data center or the streaming system 120 that will stream to the particular streaming player 144 may conduct the ping test.

At block 508, streaming latency skill compensator (SLSC) value for each of the one or more streaming players may be determined. In some cases, this SLSC value may be determined based at least in part on one or more models and/or functions that relate a player's network latency to the SLSC values for a particular game. In other cases, the SLSC value may be determined from a lookup table that the matchmaking system(s) 150 may access. It should be noted that the matchmaking system(s) 150 may be used to perform matchmaking for a variety of online games, where different online games may use different levels of network speed-based skill compensation. For example, a turn-based game may offer very little, if any, sensitivity to network speed-based skill compensation, while a fast action game may provide a relatively greater level of sensitivity to network speed-based skill compensation.

At block 510, or responding input devices for each of the one or more streaming players may be identified. As discussed above, the input devices 142 may be any suitable devices by which the streaming players 144 may interact with the online game, such as a touch screen, mouse, gamepad, or the like.

At block 512, a streaming input device skill compensator (SIDSC) value for each of the one or more streaming players may be determined. Like the SLSC values, the SIDSC values may be determined from one or more functions and/or a lookup table which relates input devices to SIDSC values.

At block 514, a modified skill score for each of the one or more streaming players may be generated based at least in part on his or her respective SLSC value, SIDSC value, and skill score. In some cases, the modified skill score may be the streaming player's skill score minus the SLSC value and plus or minus the SIDSC value. In other cases, other operations may be used to generate the modified skill score from the streaming player's skill score.

At block 516, one or more non-streaming players who wish to play the online game may be identified. Similar to identifying the streaming players 140, the non-streaming players 130 may be identified based upon information provided by the game system(s) 110 to the matchmaking system(s) 150.

At block 518, a skill score for each of the one or more non-streaming players may be determined. This process may be similar to the process described at block 504 for determining the skill score of the streaming players 140. Player identifier information for the non-streaming players 130 may be used to access the non-streaming player's skill scores from a player datastore 152.

At block 520, players may be matched to form one or more games for the one or more streaming players and the one or more non-streaming players based at least in part on the modified skill score corresponding to each of the one or more streaming players and the skill scores corresponding to each of the one or more non-streaming players. In example embodiments, players 130, 140 may be matched based at least in part on being within a threshold amount of skill score or modified skill score of each other.

It should be noted that some of the operations of method 500 may be performed out of the order presented, with additional elements, and/or without some elements. Some of the operations of method 500 may further take place substantially concurrently and, therefore, may conclude in an order different from the order of operations shown above. For example, in example embodiments, the processes of blocks 510, 512 may be executed prior to the processes of blocks 506, 508.

Figure 6:
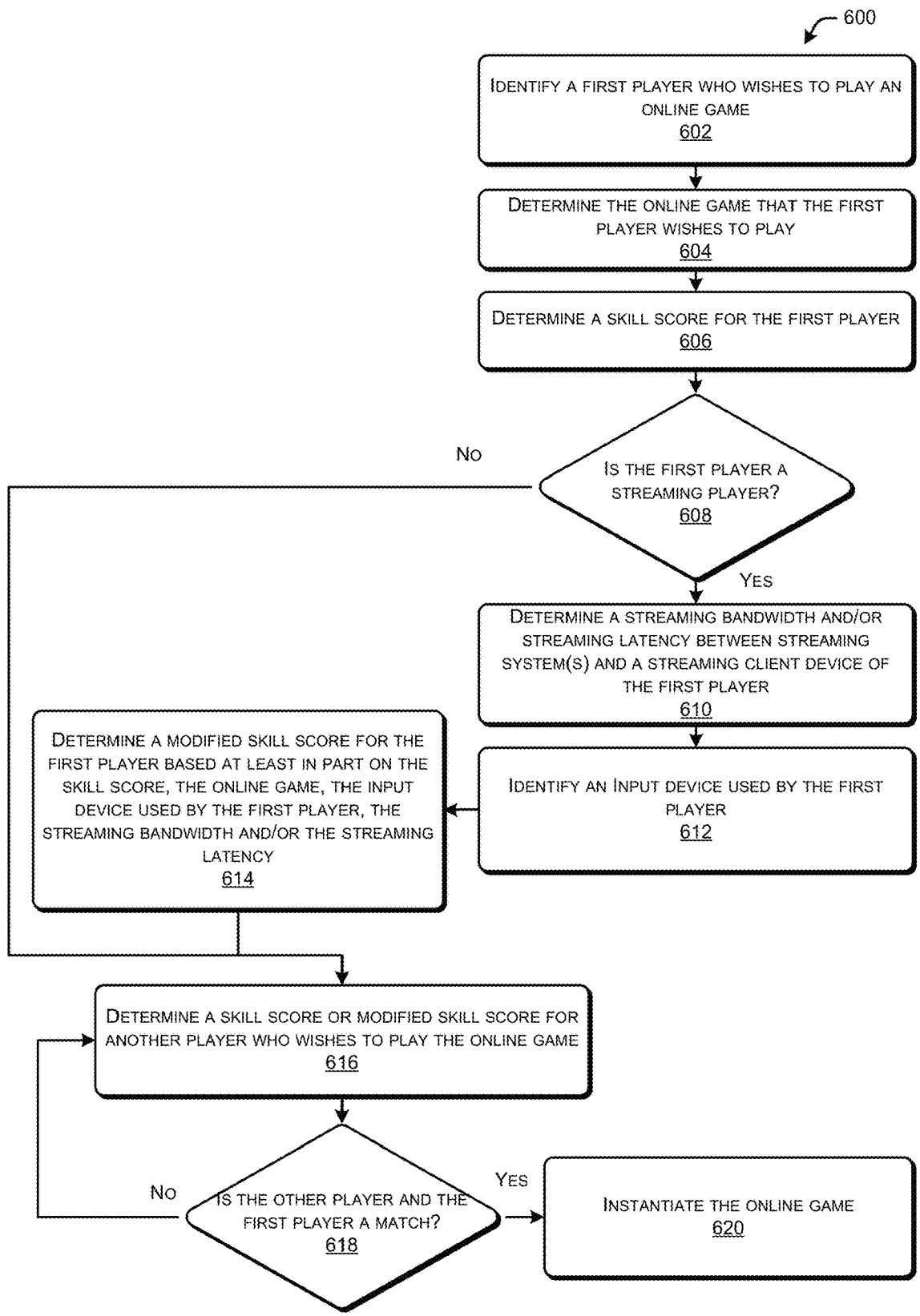
FIG. 6 illustrates a flow diagram of an example method by which a player is matched to another player for an online game, in accordance with example embodiments of the disclosure.

FIG. 6 illustrates a flow diagram of an example method 600 by which a player is matched to another player for an online game, in accordance with example embodiments of the disclosure. The method 600 may be performed by the matchmaking system(s) 150, individually or in cooperation with one or more other elements of the environment 100.

At block 602, a first player who wishes to play an online game may be identified. At block 604, the online game that the first player wishes to play may be determined. At block 606, a skill score for the first player may be determined. At block 608, it may be determined if the first player is a streaming player. If at block 608 it is determined that the first player is a streaming player, then the method 600 may continue to block 610 where a streaming bandwidth and/or streaming latency between the streaming system(s) and a streaming client device of the first player may be determined. The descriptions of the operations of blocks 602, 604, 606, 608, 610 may be substantially similar to the descriptions of the operations of blocks 302, 304, 306, 308, 310, respectively, of method 300 of FIG. 3, and in the interest of brevity, will not be repeated here.

At block 612, an input device used by the first player may be identified. In some cases, the type of input device may be indicated by the game system(s) 110 and/or streaming system(s) 120 to the matchmaking system(s) 150. In other cases, the matchmaking system(s) 150 may query the type of input device of the first player from the game system(s) 110 and/or streaming system(s) 120. In yet other cases, the matchmaking system(s) 150 may determine the type of input device of the first player from accessing the first player's profile on the player datastore 152.

At block 614, a modified skill score for the first player may be determined based at least in part on the skill score, the online game, the input device used by the first player, the streaming bandwidth and/or the streaming latency. In some cases, the modified skill score may be the player's skill score with his or her SLSC value and SIDSC value applied. In other cases, other operations may be performed to determine the streaming player's modified skill score from his or her skill score, SIDSC value, and SLSC value.

If at block 608 it was determined that the first player is not a streaming player, then the method 600 may proceed to block 616 where a skill score or modified skill score for another player who wishes to play the online game may be determined.

At block 618, it may be determined if the other player and the first player match. The other player and the first player may be a match if their respective skill score or modified skill score, depending on whether they are streaming players 144 or non-streaming players 134, are within a threshold value. If it is determined at block 618 that the other player and the first player are not a match, then the method 600 may return to block 614 to consider additional players who may be a match for the first player based at least in part on the first player's modified skill score.

On the other hand, if at block 618 it is determined that the other player and the first player are a match, then at block 620 the online game may be instantiated. Instantiation of the game may entail sending a roster of players, as identified by their respective identifiers, to the game system(s) 110 and/or the streaming system(s) 120.

It should be noted that some of the operations of method 600 may be performed out of the order presented, with additional elements, and/or without some elements. Some of the operations of method 600 may further take place substantially concurrently and, therefore, may conclude in an order different from the order of operations shown above.

FIG. 7 illustrates a chart 700 of an example set of player matchmaking according to each player's respective skill score, streaming latency skill compensator (SLSC) modified skill score, and/or streaming input device skill compensator (SIDSC) modified skill score, in accordance with example embodiments of the disclosure.

Similar to chart 400 of FIG. 4, chart 700 shows a number of players, such as player A through player I who have corresponding skill scores as shown. For example, player F may have a skill score of 54, while player G may have a skill score of 68. The skill scores used in this example may be on a 0-100 range, but any suitable range (e.g., 0-1, 0-50, etc.) may be used according to example embodiments of the disclosure. As discussed above, the skill scores may be determined by the matchmaking system(s) 150 by accessing a player datastore 152. In example embodiments, the matchmaking system(s) 150, by using a player's identifier, may be able to access the player's skill score from the player datastore 152.

The chart 700 further shows whether each of the players are either streaming players 144 or non-streaming players 134. For example, player C is a non-streaming player 134, while player H is a streaming player 144. Whether a player is streaming or non-streaming may be determined by the matchmaking system(s) 150 using an indication of the same from the game system(s) 110 and/or the streaming system(s) 120. In other cases, the matchmaking system(s) 150 may request information from either the game system(s) 110 and/or the streaming system(s) 120 about whether particular players 134, 144 are streaming or non-streaming players.

The chart 700 further includes a latency value associated with each of the streaming players 144. This latency may be a measured latency between the streaming system(s) 120 and each of the streaming client devices 140 associated with the respective streaming players 140. In some cases, this latency value may be provided by either the streaming system(s) 120 and/or the game system(s) 110. In other cases, the matchmaking system(s) 150 may request, from the streaming system(s) 120, the latency between the streaming system(s) 120 and the streaming client device 140 corresponding to particular ones of the streaming players 144. Responsive to a request by the matchmaking system(s) 150 for the latency value, the streaming system(s) 120 may engage in measuring the latency and/or bandwidth of its network (e.g., Internet, etc.) connection with the streaming client device 140 associated with the particular streaming player 144. In some cases, this may be a ping test mechanism for measuring the network latency and/or the network bandwidth.

Based at least in part on the latency, the matchmaking system(s) 150 may determine SLSC values for each of the streaming players 144. In some cases, this may entail the matchmaking system(s) 150 accessing a look-up table for the particular online game which relates network latency to SLSC values. As the network latency increases, the magnitude of the SLSC also increases to provide a greater compensation for slower network speeds.

The chart 700 further includes a type of input device 142 associated with each of the streaming players 144. In some cases, the type of input device may be received by the matchmaking system(s) 150 from the game system(s) 110 and/or streaming system(s) 120, such as in the form of messages, metadata, and/or any other suitable indicator of the input device type. In other cases, the matchmaking system(s) 150 may query the type of input device of the streaming players 144 from the game system(s) 110 and/or streaming system(s) 120. Responsive to a request by the matchmaking system(s) 150 for the latency value, the streaming system(s) 120 and/or game system(s) 110 may provide an indication of the streaming players' input device types. In yet other cases, the matchmaking system(s) 150 may determine the type of input device of the streaming players by accessing the streaming players' profiles on the player datastore 152.

Based at least in part on the input device, the matchmaking system(s) 150 may determine SIDSC values for each of the streaming players 144. In some cases, this may entail the matchmaking system(s) 150 accessing a look-up table for the particular online game which relates input devices to SIDSC values. The SIDSC values may be more negative for those devices that are more difficult to use for gaming. In other words, a greater skill compensation may be provided for input devices that may reduce player responsiveness relative to input devices that enable greater player responsiveness. For example, the SIDSC for a game controller may be 3, while an SIDSC for a touch screen may be −7. A modified skill score for each of the streaming players 144 may be determined by combining the streaming player's skill score, SLSC value, and SIDSC value. Once the modified skill scores for each of the streaming players 144 have been determined, the players 134, 144 may be compared to each other according to their modified skill scores or skill scores depending on whether they are a streaming player 144 or a non-streaming player 144, respectively.

Once the modified skill scores for each of the streaming players 144 have been determined, the players 134, 144 may be compared to each other according to their modified skill scores or skill scores depending on whether they are a streaming player 144 or a non-streaming player 144, respectively. Based at least in part on the modified skill scores for the streaming players 144 and the skill scores for the non-streaming players 134, the players 134, 144 may be combined into different online games. This process may involve finding those players who have respective modified skill scores or skill scores that are within a threshold value of each other. For example, as shown, three online games may be formed for playing this online game. Each of the players 134, 144 on these teams may have modified skill scores or skill scores that are within a threshold of each other. As shown online game 1 may include players A, and G, while online game 2 may include players B, C, F, H, and I, while online game 3 may include players D and E. Each of these online games may instantiated by sending the corresponding online game rosters to the game system(s) 110.

Figure 8:
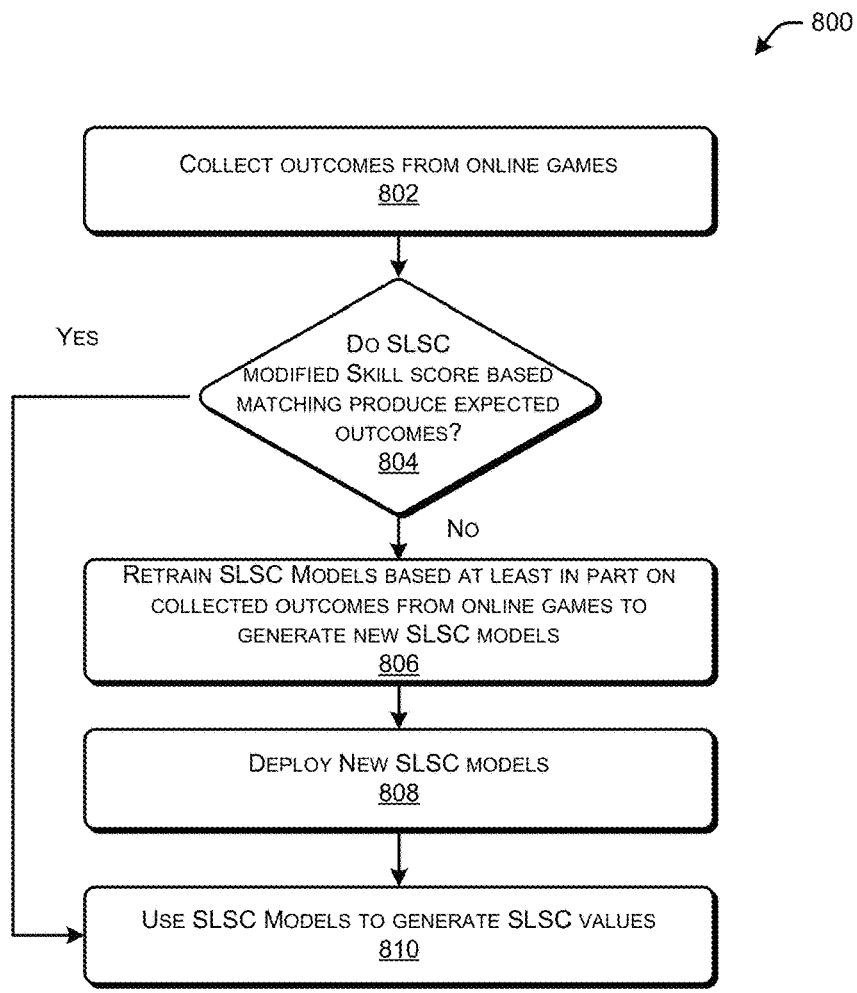
FIG. 8 illustrates a flow diagram of an example method by which new streaming latency skill compensator models (SLSC) may be deployed, in accordance with example embodiments of the disclosure.

FIG. 8 illustrates a flow diagram of an example method 800 by which new streaming latency skill compensator models (SLSC) may be deployed, in accordance with example embodiments of the disclosure. The method 800 may be performed by the matchmaking system(s) 150, individually or in cooperation with one or more other elements of the environment 100.

At block 802, outcomes from online games may be collected. These outcomes may include the performance of various streaming players 144 and non-streaming players 134 who are matched together in common online games. For example, the outcomes may include scores and/or indications of winners and losers.

At block 804, it may be determined whether the SLSC modified skill score based matching procedure performed as expected. If the SLSC based matching performed correctly, then it may be expected that streaming players 144 with a modified skill score close to skill scores of non-streaming players 134 would perform similarly.

If it is determined at block 804, that the matching using the SLSC procedure do not produce expected outcomes, then the method 800 may proceed to block 806 where the SLSC models may be retrained based at least in part on the collected outcomes from online games to generate new SLSC models. These SLSC models may be functions and/or look-up tables that relate a network latency and or bandwidth to SLSC values.

At block 808, the new SLSC models may be deployed. When deployed, the matchmaking system(s) 150 may be able to access the SLSC models in the form of look-up tables, functions, or any other suitable relation between network speed and SLSC values. The new model deployment may entail replacing previous SLSC models, such as previous lookup tables or functions with the new SLSC models, as determined by the processes of block 806.

At block 810, the SLSC models may be used to generate SLSC values for the purposes of matchmaking for online games. At block 804, if it was determined that the mask matching procedures produced expected results, then the method 800 may proceed to block 810 where the matchmaking system(s) 150 continue to use the SLSC models to generate SLSC values for the purposes of matchmaking online players.

It should be noted that some of the operations of method 800 may be performed out of the order presented, with additional elements, and/or without some elements. Some of the operations of method 800 may further take place substantially concurrently and, therefore, may conclude in an order different from the order of operations shown above.

Figure 9:
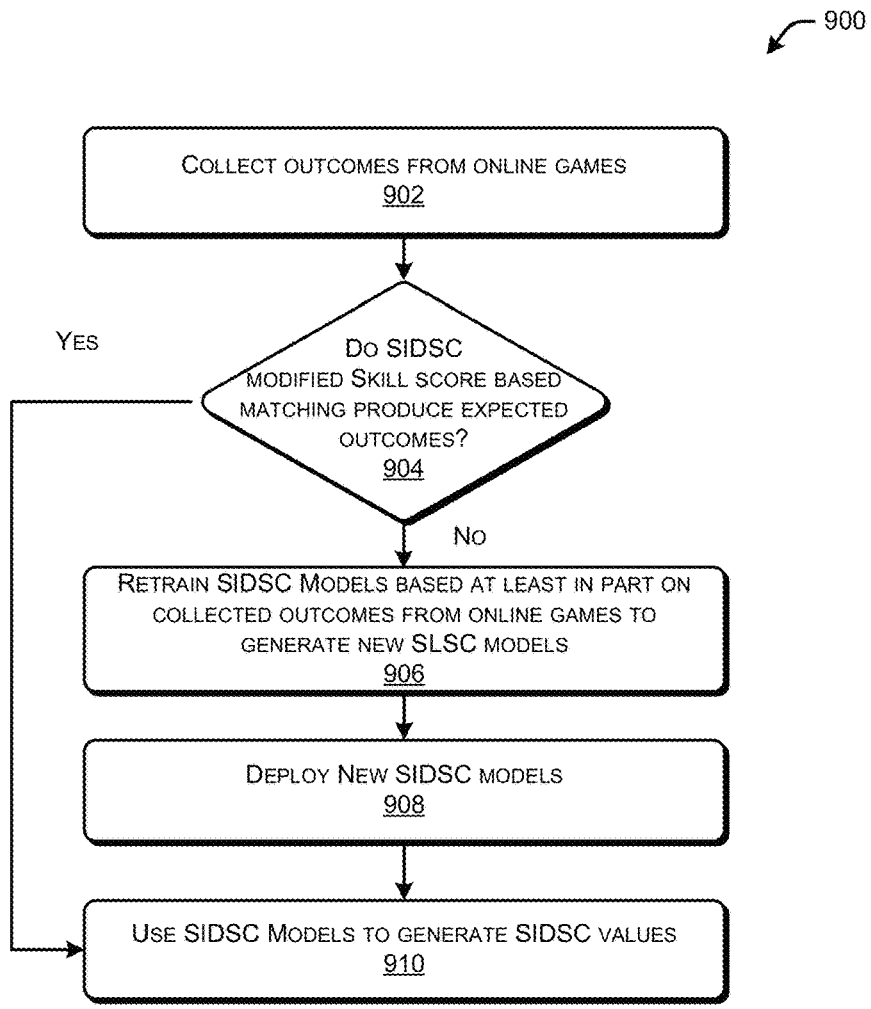
FIG. 9 illustrates a flow diagram of an example method by which new streaming input device skill compensator (SIDSC) models may be deployed, in accordance with example embodiments of the disclosure.

FIG. 9 illustrates a flow diagram of an example method 900 by which new streaming input device skill compensator (SIDSC) models may be deployed, in accordance with example embodiments of the disclosure. The method 900 may be performed by the matchmaking system(s) 150, individually or in cooperation with one or more other elements of the environment 100.

At block 902, outcomes from online games may be collected. These outcomes may include the performance of various streaming players 144 and non-streaming players 134 who are matched together in common online games. For example, the outcomes may include scores and/or indications of winners and losers.

At block 904, it may be determined whether the SIDSC modified skill score based matching procedure performed as expected. If the SIDSC based matching performed correctly, then it may be expected that streaming players 144 with a modified skill score close to skill scores of non-streaming players 134 would perform similarly.

If it is determined at block 904, that the matching using the SIDSC procedure do not produce expected outcomes, then the method 900 may proceed to block 906 where the SIDSC models may be retrained based at least in part on the collected outcomes from online games to generate new SIDSC models. These SIDSC models may be functions and/or look-up tables that relate input devices 142 to SIDSC values.

At block 908, the new SIDSC models may be deployed. When deployed, the matchmaking system(s) 150 may be able to access the SIDSC models in the form of look-up tables, functions, or any other suitable relation between input devices and SIDSC values. The new model deployment may entail replacing previous SIDSC models, such as previous lookup tables or functions with the new SIDSC models, as determined by the processes of block 906.

At block 910, the SIDSC models may be used to generate SIDSC values for the purposes of matchmaking for online games. At block 904, if it was determined that the mask matching procedures produced expected results, then the method 900 may proceed to block 910 where the matchmaking system(s) 150 continue to use the SIDSC models to generate SIDSC values for the purposes of matchmaking online players.

It should be noted that some of the operations of method 900 may be performed out of the order presented, with additional elements, and/or without some elements. Some of the operations of method 900 may further take place substantially concurrently and, therefore, may conclude in an order different from the order of operations shown above.

Figure 10:
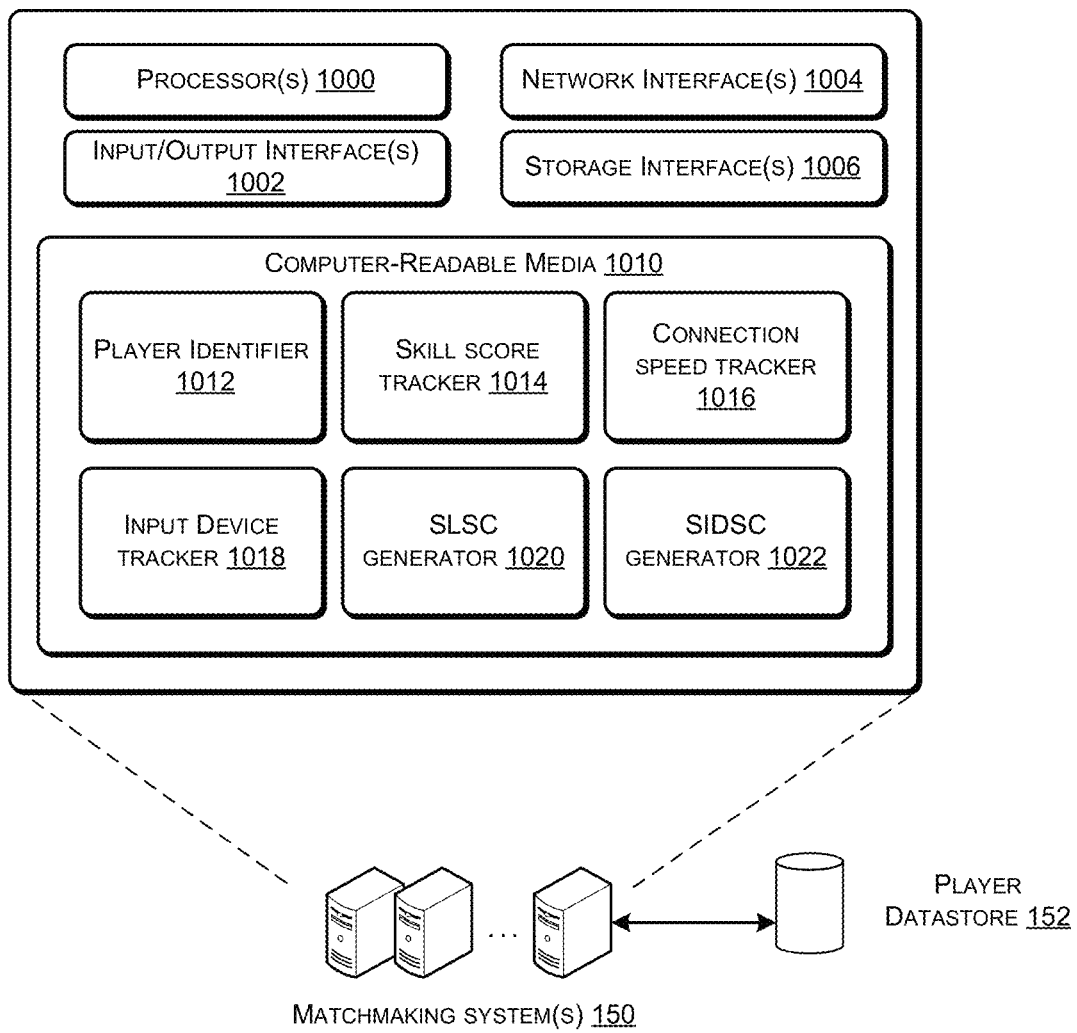
FIG. 10 illustrates a block diagram of example matchmaking system(s) that may provide matchmaking for online games, in accordance with example embodiments of the disclosure.

FIG. 10 illustrates a block diagram of example matchmaking system(s) 150 that may provide matchmaking for online games, in accordance with example embodiments of the disclosure. The matchmaking system(s) 150 may include one or more processor(s) 1000, one or more input/output (I/O) interface(s) 1002, one or more network interface(s) 1004, one or more storage interface(s) 1006, and computer-readable media 1010.

In some implementations, the processors(s) 1000 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 1000 may possess its own local memory, which also may store program modules, program data, and/or one or more operating system(s). The one or more processor(s) 1000 may include one or more cores.

The one or more input/output (I/O) interface(s) 1002 may enable the matchmaking system(s) 150 to detect interaction with a user and/or other system(s), such as one or more game system(s) 110 or one or more streaming system(s) 120. The I/O interface(s) 1002 may include a combination of hardware, software, and/or firmware and may include software drivers for enabling the operation of any variety of I/O device(s) integrated on the matchmaking system(s) 150 or with which the matchmaking system(s) 150 interacts, such as displays, microphones, speakers, cameras, switches, and any other variety of sensors, or the like.

The network interface(s) 1004 may enable the matchmaking system(s) 150 to communicate via the one or more network(s). The network interface(s) 1004 may include a combination of hardware, software, and/or firmware and may include software drivers for enabling any variety of protocol-based communications, and any variety of wireline and/or wireless ports/antennas. For example, the network interface(s) 1004 may comprise one or more of a cellular radio, a wireless (e.g., IEEE 802.1x-based) interface, a Bluetooth® interface, and the like. In some embodiments, the network interface(s) 1004 may include radio frequency (RF) circuitry that allows the matchmaking system(s) 150 to transition between various standards. The network interface(s) 1004 may further enable the matchmaking system(s) 150 to communicate over circuit-switch domains and/or packet-switch domains.

The storage interface(s) 1006 may enable the processor(s) 1000 to interface and exchange data with the computer-readable medium 1010, as well as any storage device(s) external to the matchmaking system(s) 150, such as the player datastore 152.

The computer-readable media 1010 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 1010 may be implemented as computer-readable storage media (CRSM), which may be any available physical media accessible by the processor(s) 1000 to execute instructions stored on the memory 1010. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information and which can be accessed by the processor(s) 1000. The computer-readable media 1010 may have an operating system (OS) and/or a variety of suitable applications stored thereon. The OS, when executed by the processor(s) 1000 may enable management of hardware and/or software resources of the matchmaking system(s) 150.

Several functional blocks having instruction, data stores, and so forth may be stored within the computer-readable media 1010 and configured to execute on the processor(s) 1000. The computer readable media 1010 may have stored thereon a player identifier block 1012, a skill score tracker block 1014, a connection speed block 1016, an input device block 1018, a SLSC block 1020, and a SIDSC block 1022. It will be appreciated that each of the functional blocks 1012, 1014, 1016, 1018, 1020, 1022, may have instructions stored thereon that when executed by the processor(s) 1000 may enable various functions pertaining to the operations of the matchmaking system(s) 150.

The instructions stored in the player identifier block 1012, when executed by the processor(s) 1000, may configure the matchmaking system(s) 150 to identify player(s), such as new player(s) who wish to join an online game. In some cases, the processor(s) 1000 may request player identification information, such as from the game system(s) 110 and/or streaming system(s) 120. The processor(s) 1000 may also match players based upon their corresponding skill scores and/or modified skill scores.

The instructions stored in the skill score tracker block 1014, when executed by the processor(s) 1000, may configure the matchmaking system(s) 150 to determine skill scores of players who wish to play an online game. The processor(s) 1000 may further use player identification information to access the player datastore to access information, such as skill scores of players. The processor(s) 1000 may also update skill scores based at least in part on player performance.

The instructions stored in the connection speed tracker block 1016, when executed by the processor(s) 1000, may configure the matchmaking system(s) 150 to determine network speeds (e.g., network latency, network bandwidth, etc.) between the streaming system(s) 120 and the streaming client device(s) 140. In some cases, the processor(s) 1000 may solicit the network speed information form the streaming system(s) 120.

The instructions stored in the input device block 1018, when executed by the processor(s) 1000, may configure the matchmaking system(s) 150 to determine the input device type for streaming players. The processor(s) 1000 may determine the input device of a streaming user based at least in part on receiving this information from the game system(s) 110, the streaming system(s) 120, and/or the streaming client device(s) 140. In some cases, the processor(s) 1000 may query the input device information from the game system(s) 110, the streaming system(s) 120, and/or the streaming client device(s). In other cases, the processor(s) 1000 may determine input device type of a streaming player 144 from a user profile, as stored on the player datastore 152.

The instructions stored in the SLSC block 1020, when executed by the processor(s) 1000, may configure the matchmaking system(s) 150 to determine an SLSC value for streaming players 144 based at least in part on the streaming player's network connectivity speeds, such as network latency. The processor(s) 1000 may maintain a SLSC value to network speed correspondence, such as a function and/or look-up table. The processor(s) 1000 may also update models for generating the SLSC values.

The instructions stored in the SIDSC block 1022, when executed by the processor(s) 1000, may configure the matchmaking system(s) 150 to determine an SIDSC value for streaming players 144 based at least in part on their input device type. Processor(s) 1000 may maintain a SIDSC value to input device type correspondence, such as a look-up table. The processor(s) 1000 may also update models for generating the SIDSC values.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:
one or more processors; and
one or more computer-readable media storing computer-executable instructions that, when executed by the one or more processors, cause the one or more processors to:
determine a first skill score associated with a first player for an online game, the first player streaming the online game;
determine a second skill score associated with a second player for the online game;
determine a network latency value associated with the first player;
generate a modified first skill score based at least in part on the network latency value and the first skill score;
determine that the modified first skill score is within a threshold of the second skill score; and
instantiate the online game with the first player and the second player.

2. The system of claim 1, wherein to identify the first player and the second player who wish to play the online game, the computer-executable instructions further cause the one or more processors to:
receive, from a game system, a first message indicating that that the first player is to be matched for online gaming, and that the first player will stream the online game.

3. The system of claim 1, wherein to determine the first skill score associated with the first player, the computer-executable instructions further cause the one or more processors to:
determine an identifier of the first player;
access a player datastore storing respective player skill scores corresponding to a plurality of players, the plurality of players comprising the first player; and
determine, from the player datastore the first skill score based at least in part on the identifier.

4. The system of claim 1, wherein to determine the network latency value associated with the first player, the computer-executable instructions further cause the one or more processors to:
request, from a streaming system, the network latency value; and
receive, from the streaming system, the network latency value.

5. The system of claim 1, wherein to generate the modified first skill score, the computer-executable instructions further cause the one or more processors to:
determine, based at least in part on the network latency value, a streaming latency skill compensator (SLSC) value; and
determine the modified first skill score further based at least in part on the SLSC value.

6. The system of claim 1, wherein to instantiate the online game with the first player and the second player, the computer-executable instructions further cause the one or more processors to:
send, to a game system, a first identifier of the first player and a second identifier of the second player.

7. The system of claim 1, wherein the computer-executable instructions further cause the one or more processors to:

identify an input device associated with the first player, wherein the modified first skill score is further based at least in part on the input device.

8. The system of claim 1, wherein the network latency value is a first network latency value, and wherein the computer-executable instructions further cause the one or more processors to:
determine a third skill score associated with a third player, the third player streaming the online game;
determine a second network latency value associated with the third player;
generate a modified third skill score based at least in part on the second network latency value and the third skill score; and
exclude the third player from the online game based at least in part on determining that the modified third skill score is outside the threshold of the second skill score.

9. A computer-implemented method, comprising:
identifying, by one or more processors, a first player, a second player, and a third player for an online game;
determining, by the one or more processors, a first skill score associated with the first player;
determining, by the one or more processors, a second skill score associated with the second player;
determining, by the one or more processors, a third skill score associated with the third player;
determining, by the one or more processors, that the first player will stream the online game;
determining, by the one or more processors, a first network latency value associated with the first player;
determining, by the one or more processors, that the second player will stream the online game;
determining, by the one or more processors, a second network latency value associated with the second player;
generating, by the one or more processors, a modified first skill score based at least in part on the first network latency value;
generating, by the one or more processors, a modified second skill score based at least in part on the second network latency value;
determining, by the one or more processors, that the modified first skill score is outside of a threshold of the modified second skill score;
determining, by the one or more processors, that the modified first skill score is within the threshold of the third skill score; and
instantiating, by the one or more processors, the online game with the first player and the third player.

10. The computer-implemented method of claim 9, wherein generating the modified first skill score further comprises:
determining, by the one or more processors and based at least in part on the first network latency value, a first streaming latency skill compensator (SLSC) value; and
determining, by the one or more processors, the first modified skill score is further based at least in part on the first SLSC value.

11. The computer-implemented method of claim 10, wherein generating the modified second skill score further comprises:
determining, by the one or more processors and based at least in part on the second network latency value, a second SLSC value, wherein the second SLSC value is different from the first SLSC value; and
determining, by the one or more processors, the second modified skill score is further based at least in part on the second SLSC value.

12. The computer-implemented method of claim 9, further comprising:
determining, by the one or more processors, a first input device associated with the first player; and
determining, by the one or more processors and based at least in part on the first input device, a first streaming input device skill compensator (SIDSC) value, wherein the modified first skill score is further based at least in part on the first SIDSC value.

13. The computer-implemented method of claim 12, further comprising:
determining, by the one or more processors, a second input device associated with the second player; and
determining, by the one or more processors and based at least in part on the second input device, a second SIDSC value, wherein the modified second skill score is further based at least in part on the second SIDSC value, wherein the second SIDSC value is different from the first SIDSC value.

14. The computer-implemented method of claim 9, wherein determining the first network latency value further comprises:
requesting, from a streaming system, the first network latency value; and
receiving, from the streaming system, the first network latency value.

15. A system, comprising:
one or more processors; and
one or more computer-readable media storing computer-executable instructions that, when executed by the one or more processors, cause the one or more processors to:
determine a first skill score associated with a first player, the first player streaming an online game;
determine a second skill score associated with a second player;
determine an input device associated with the first player;
generate a modified first skill score based at least in part on the input device and the first skill score;
determine that the modified first skill score is within a threshold of the second skill score; and
instantiate the online game with the first player and the second player.

16. The system of claim 15, wherein the input device is at least one of: (i) a touch screen; (ii) a mouse; (iii) a joystick; (iv) a game pad; (v) a wearable sensor device; or (vi) a motion detection device.

17. The system of claim 15, wherein the computer-executable instructions cause the one or more processors to generate the modified first skill score comprises the computer-executable instructions further cause the one or more processors to:
determine, based at least in part on the input device, a streaming input device skill compensator (SIDSC) value; and
determine the modified first skill score further based at least in part on the SIDSC value.

18. The system of claim 15, wherein the computer-executable instructions further cause the one or more processors to:
determine a network latency value associated with the first player; and
determine, based at least in part on the network latency value, a streaming input latency skill compensator (SLSC) value, wherein the modified first skill score is further based at least in part on the SLSC value.

19. The system of claim 18, wherein to determine the network latency value associated with the first player, the computer-executable instructions further cause the one or more processors to:
   request, from a streaming system, the network latency value; and
   receive, from the streaming system, the network latency value.

20. The system of claim 15, wherein to instantiate the online game with the first player and the second player, the computer-executable instructions further cause the one or more processors to:
   send, to a game system, a first identifier of the first player and a second identifier of the second player.

* * * * *